No. 689,050. Patented Dec. 17, 1901.
S. D. HOBSON.
PROPELLING MECHANISM.
(Application filed July 25, 1901.)
(No Model.)
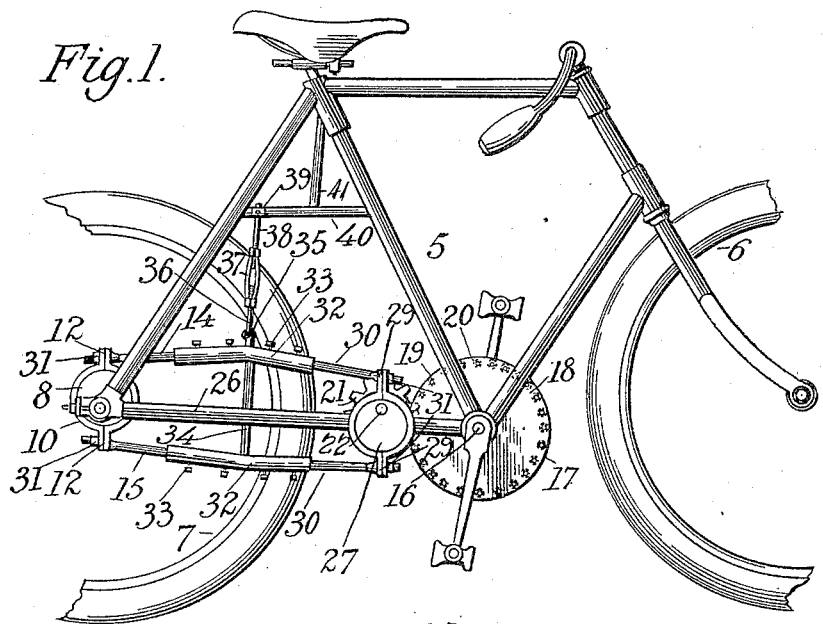
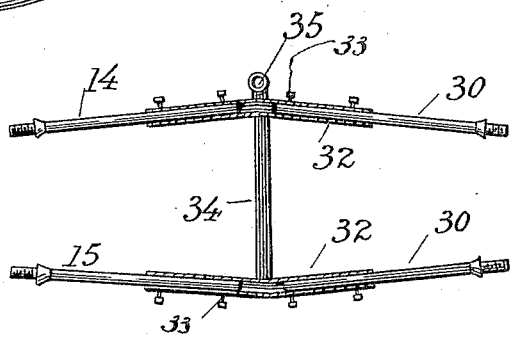
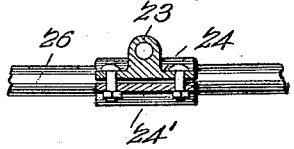
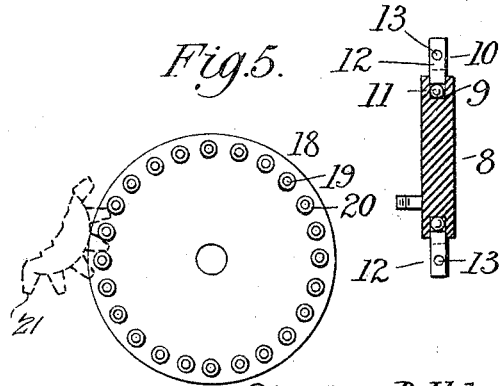
Witnesses:
J. S. Bowen.
Geo. H. Chandlee.
Stephen D. Hobson, Inventor
by C. A. Snow & Co.
Attorneys

UNITED STATES PATENT OFFICE.

STEPHEN D. HOBSON, OF STAFFORD, KANSAS.

PROPELLING MECHANISM.

SPECIFICATION forming part of Letters Patent No. 689,050, dated December 17, 1901.

Application filed July 25, 1901. Serial No. 69,720. (No model.)

*To all whom it may concern:*

Be it known that I, STEPHEN D. HOBSON, a citizen of the United States, residing at Stafford, in the county of Stafford and State of Kansas, have invented a new and useful Propelling Mechanism for Vehicles, of which the following is a specification.

This invention relates to propelling or driving means in general, and has for its object to provide improved means of this character which may be readily applied for use in various capacities, and especially designed to obviate the employment of sprocket-chains and drive-belts, and also arranged for changing the gear with a minimum amount of labor.

A further object of the invention is to provide a construction wherein the parts will have an easy operation, other objects and advantages of the invention being apparent from the following description.

In the drawings forming a portion of this specification, and in which like numerals of reference indicate similar parts in the several views, Figure 1 is an elevation showing a bicycle provided with a gearing constructed in accordance with the present invention. Fig. 2 is a like view showing the connecting-rods employed, the sleeves connecting the sections of the rods being shown in section. Fig. 3 is a sectional view showing the manner of mounting the slidable pillow-block in which the shaft of the forward eccentric is mounted and which permits of changing the gear of the bicycle. Fig. 4 is a sectional view showing one of the eccentrics with its strap and the intervening bearing-balls. Fig. 5 is a view showing the drive-sprocket with one of the side plates thereof removed. Fig. 6 is a sectional view showing the plates which hold the pillow-blocks adjustably to the tie-rods.

In setting forth the present invention I have shown in the drawings a bicycle equipped with my improved propelling means, as such application of the invention is the simplest and most readily understood and illustrated; but I do not wish to be understood as limiting myself to the application of the invention to bicycles alone, as the mechanism is designed for transmitting power in general and not for any particular application thereof.

Referring now to the drawings, there is shown a bicycle including a frame 5, having a front or steering wheel 6, mounted in the usual manner, and also a rear or driving wheel 7, and upon the hub of this rear wheel is mounted eccentrically a disk 8, having a peripheral groove 9, in which is engaged a strap 10, and between this strap and the bottom of the groove are disposed bearing-balls 11 to reduce the friction between the strap and eccentric disk. The strap includes two semicircular sections, as shown, at the ends of which are radially-extending ears 12, having alining perforations 13, and through these perforations of each pair of ears are passed the threaded ends of the sections 14 and 15 of connecting-rods, the specific construction of which will be presently explained.

In the frame 5 is mounted the usual crank-axle 16, on which is fixed a drive-gear 17, consisting of spaced plates 18 of disk shape and which are connected adjacent to their peripheries by the short shafts 19 of friction-rollers 20, which are successively and directly engaged by the teeth of a gear 21, mounted upon a shaft 22, journaled in pillow-block 23, formed upon the plate 24, having arcuate end portions to fit over the respective rear reach-bars 26 and a connecting straight portion. A second and similar plate 24' has its arcuate ends disposed against the under sides of the reach-bars, and clamping-bolts are passed through the intermediate straight portions of the plates to clamp their arcuate ends upon the reach-bars. This construction provides for the substitution of a larger gear for the gear 21, for the purpose as is well understood.

The shaft 22 carries also an eccentric disk 27, having the same construction as the first disk referred to, and the strap 28 thereof being also formed in two pieces of semicircular form having radiating ears 29, provided with alining perforations. In the perforations of the ears are engaged the threaded ends of other connecting-rod sections 30, and upon the threaded portions of all of these connecting-rod sections are mounted screws 31 for adjusting them through the perforations and holding them securely, as also for holding the sections of the eccentric-straps in place. Each connecting-rod also includes a sleeve 32, into the ends of which the sections 15 and 30 of that rod are disposed and are held adjustably by set-screws 33, and thus when the pillow-blocks are adjusted along the connecting-rods or tie-rods to permit of the use of a larger or smaller gear 21 the connecting-rods may be adjusted in length to correspond thereto.

The sleeves 32 of the connecting-rods are connected by a cross-brace 34, which projects above the upper sleeve and is provided with an eye 35, with which is pivotally engaged a threaded rod 36, with which in turn is engaged a turnbuckle 37, and with the opposite end of the turnbuckle is engaged a second threaded rod 38, mounted at its upper end in a block 39, pivoted upon a cross-tube 40 of the bicycle-frame, connecting the seat-tube with the rear forks of the frame, and this cross-tube has also a tube 41' connected thereto and to the upper end of the seat-tube at its point of connection with the rear forks. The connecting-rods extend in general in the same lines as the chain of a sprocket-driven bicycle, the eccentric 8 being secured to the rear wheel-hub at a point within the rear forks of the frame and the eccentric 27 being secured to the shaft 22 at a point outside the frame. The connecting-bars extend above and below the right-hand member of the rear forks and cross the same, the vertical connecting-bar 34, however, being at all times within the line of said fork members. On some frames it may be necessary to bend the fork member slightly out of alinement in order to permit of the proper working of the connecting-rods; but usually this will not be required. With this construction it will be seen that as the drive-gear is rotated through the medium of the pedals and cranks connected to its shaft the front gear 21 will also be rotated, and therewith the eccentric 27, which latter will give to the connecting-rods a rocking motion, which will be communicated to the rear eccentric to rotate the latter and operate the drive-wheel. As the connecting-rods are hung loosely on the vertically-disposed rod, the necessary movement of the connecting-rod is not interfered with and the rod is kept in proper position to follow the movement of the driving-eccentric and to transmit the movements thereof in reverse direction to the eccentric of the rear or driving wheel of the bicycle.

The gear-wheel 21 is so formed that the central disk portion thereof projects laterally beyond the bases of the teeth to roll upon the peripheries of the disks of the drive-gear, thus preventing excessive friction between the wheels by limiting the projection of the teeth of one in the inclosure of the other.

What is claimed is—

1. The combination with a driving-shaft having an eccentric mounted thereon, of a driven shaft, an eccentric on said driven shaft, straps arranged on said eccentric, upper and lower connecting-rods, connected intermediate of their length and secured rigidly to said eccentric-strap, a supporting-lever pivoted to a fixed point, and a pivotal connection between the lower end of said lever and one of said connecting-rods to permit free swinging and rocking movement of said connecting-rods.

2. The combination with a driven shaft having an eccentric mounted thereon, a driving-shaft adjustable from and toward said driven shaft, an eccentric secured on the driving-shaft, straps arranged on said eccentric, adjustable connecting-rods secured to said straps, and a pivoted supporting-lever having a connection with said rods at a point intermediate of the length of the latter, substantially as specified.

3. The combination of driving and driven shafts, one of which is adjustable from and toward the other, eccentrics carried by said shafts, straps mounted on said eccentrics, a connecting means between the eccentric-straps comprising upper and lower connected tubes and bars telescopically adjusted therein and secured to the eccentric-straps, and a pivoted lever having a pivotal connection with said connecting means, substantially as specified.

4. The combination with driving and driven shafts, one of which is adjustable from and toward the other, of eccentrics carried by said shafts, eccentric-straps each comprising two semicircular portions adapted to fit over the eccentric and having radially-extended bolting-ears, mechanism for connecting the eccentrics to each other and comprising upper and lower tubes having a central connection and rods passing through and connecting the eccentric-strap ears, one end of each of said rods being telescopically adjustable in one of the central tubes, and means for supporting said connecting mechanism to permit of free swinging and rocking movement of the latter, substantially as specified.

In testimony that I claim the foregoing as my own I have hereto affixed my signature in the presence of two witnesses.

STEPHEN D. HOBSON.

Witnesses:
  ANDREW W. HARTNETT,
  E. N. MAXFIELD.